United States Patent
Kuffel et al.

(10) Patent No.: US 11,646,556 B2
(45) Date of Patent: May 9, 2023

(54) RACEWAY SYSTEM

(71) Applicant: Panduit Corp., Tinley Park, IL (US)

(72) Inventors: Gregory L. Kuffel, Plainfield, IL (US); Jerry A. Wiltjer, Frankfort, IL (US)

(73) Assignee: Panduit Corp., Tinley Park, IL (US)

( * ) Notice: Subject to any disclaimer, the term of this patent is extended or adjusted under 35 U.S.C. 154(b) by 302 days.

(21) Appl. No.: 17/038,090

(22) Filed: Sep. 30, 2020

(65) Prior Publication Data

US 2021/0119427 A1 Apr. 22, 2021

Related U.S. Application Data

(60) Provisional application No. 62/916,318, filed on Oct. 17, 2019.

(51) Int. Cl.
*H02G 3/04* (2006.01)

(52) U.S. Cl.
CPC .................................. *H02G 3/045* (2013.01)

(58) Field of Classification Search
CPC .................................. E04B 1/00; H02G 3/045
USPC ........................................................ 172/72 R
See application file for complete search history.

(56) References Cited

U.S. PATENT DOCUMENTS

| | | | | |
|---|---|---|---|---|
| 1,986,965 A | * | 1/1935 | Harrison | H02G 3/0608 191/23 R |
| 2,738,990 A | * | 3/1956 | Hill | H02G 3/085 285/154.4 |
| 2,956,587 A | * | 10/1960 | Fisher | F16L 23/14 138/158 |
| 3,968,322 A | * | 7/1976 | Taylor | H02G 3/045 174/101 |
| 4,065,896 A | * | 1/1978 | Penczak | E04B 5/48 52/220.5 |
| 4,398,564 A | * | 8/1983 | Young | H02G 3/0418 138/155 |
| 4,535,703 A | * | 8/1985 | Henriott | H02G 3/045 108/50.02 |
| 4,905,433 A | * | 3/1990 | Miller | H02G 3/0431 362/147 |
| 4,942,271 A | * | 7/1990 | Corsi | H02G 3/0418 174/101 |
| 5,067,678 A | | 11/1991 | Henneberger et al. | |
| 5,316,243 A | | 5/1994 | Henneberger | |
| 5,469,893 A | | 11/1995 | Caveney et al. | |
| 5,753,855 A | | 5/1998 | Nicoli et al. | |

(Continued)

FOREIGN PATENT DOCUMENTS

| CA | 2417742 A1 | 3/2002 |
|---|---|---|
| DE | 202006012796 U1 | 1/2008 |

(Continued)

*Primary Examiner* — Krystal Robinson
(74) *Attorney, Agent, or Firm* — Christopher S. Clancy; James H. Williams; Aimee E. McVady

(57) ABSTRACT

A raceway system that provides a cable routing pathway that is easily configured during installation and reconfigured if modifications are required. The raceway system includes at least one U-shaped channel. The U-shaped channel is defined by a base and sidewalls extending perpendicularly from outer edges of the base. The sidewalls include a plurality of apertures in the sidewalls. At least one insert is secured to the sidewall at one of the apertures in the sidewalls.

17 Claims, 14 Drawing Sheets

(56) References Cited

U.S. PATENT DOCUMENTS

| | | | |
|---|---|---|---|
| 5,792,993 A * | 8/1998 | Rinderer | H02G 3/0608 174/101 |
| 5,898,132 A * | 4/1999 | Lee | H02G 3/045 16/268 |
| 6,037,543 A | 3/2000 | Nicoli et al. | |
| 6,216,746 B1 * | 4/2001 | Guebre-Tsadik | H02G 3/0608 138/158 |
| 6,380,484 B1 * | 4/2002 | Theis | F16L 3/26 174/101 |
| 6,406,327 B1 * | 6/2002 | Soon | H02G 11/00 361/679.02 |
| 6,559,378 B1 | 5/2003 | Bernard | |
| 6,631,875 B1 | 10/2003 | Kampf et al. | |
| 6,739,795 B1 | 5/2004 | Haataja et al. | |
| 6,756,539 B1 * | 6/2004 | VanderVelde | H02G 3/0608 52/36.2 |
| 6,903,266 B1 * | 6/2005 | Luciere | H02G 3/0608 174/505 |
| 7,049,508 B2 * | 5/2006 | Bushey | H02G 3/0425 174/68.3 |
| 7,315,680 B1 | 1/2008 | Rapp et al. | |
| 7,383,634 B2 | 6/2008 | Vuk | |
| 7,471,868 B2 | 12/2008 | Bayazit et al. | |
| 7,668,433 B2 | 2/2010 | Bayazit et al. | |
| 7,742,675 B2 | 6/2010 | Sayres et al. | |
| 8,254,744 B2 | 8/2012 | Sayres et al. | |
| 8,950,051 B2 | 2/2015 | Kampf et al. | |
| 8,965,167 B2 | 2/2015 | Bayazit et al. | |
| 9,356,436 B2 | 5/2016 | Bayazit et al. | |
| D826,033 S | 8/2018 | Feng | |
| 10,209,472 B2 | 2/2019 | Estrada Gonzalez | |
| 2003/0051892 A1 | 3/2003 | Mattei et al. | |
| 2003/0207602 A1 * | 11/2003 | Handler | H02G 3/105 439/215 |
| 2005/0126097 A1 * | 6/2005 | Hill | H02G 1/00 52/263 |
| 2018/0316166 A1 * | 11/2018 | Shitamichi | H02G 3/0418 |
| 2019/0356118 A1 * | 11/2019 | Capulli | H02G 3/045 |

FOREIGN PATENT DOCUMENTS

| | | | |
|---|---|---|---|
| EP | 1087160 B1 | 5/2002 | |
| WO | WO-03098761 A1 * | 11/2003 | H02G 3/0418 |
| WO | 2004003617 A1 | 1/2004 | |

\* cited by examiner

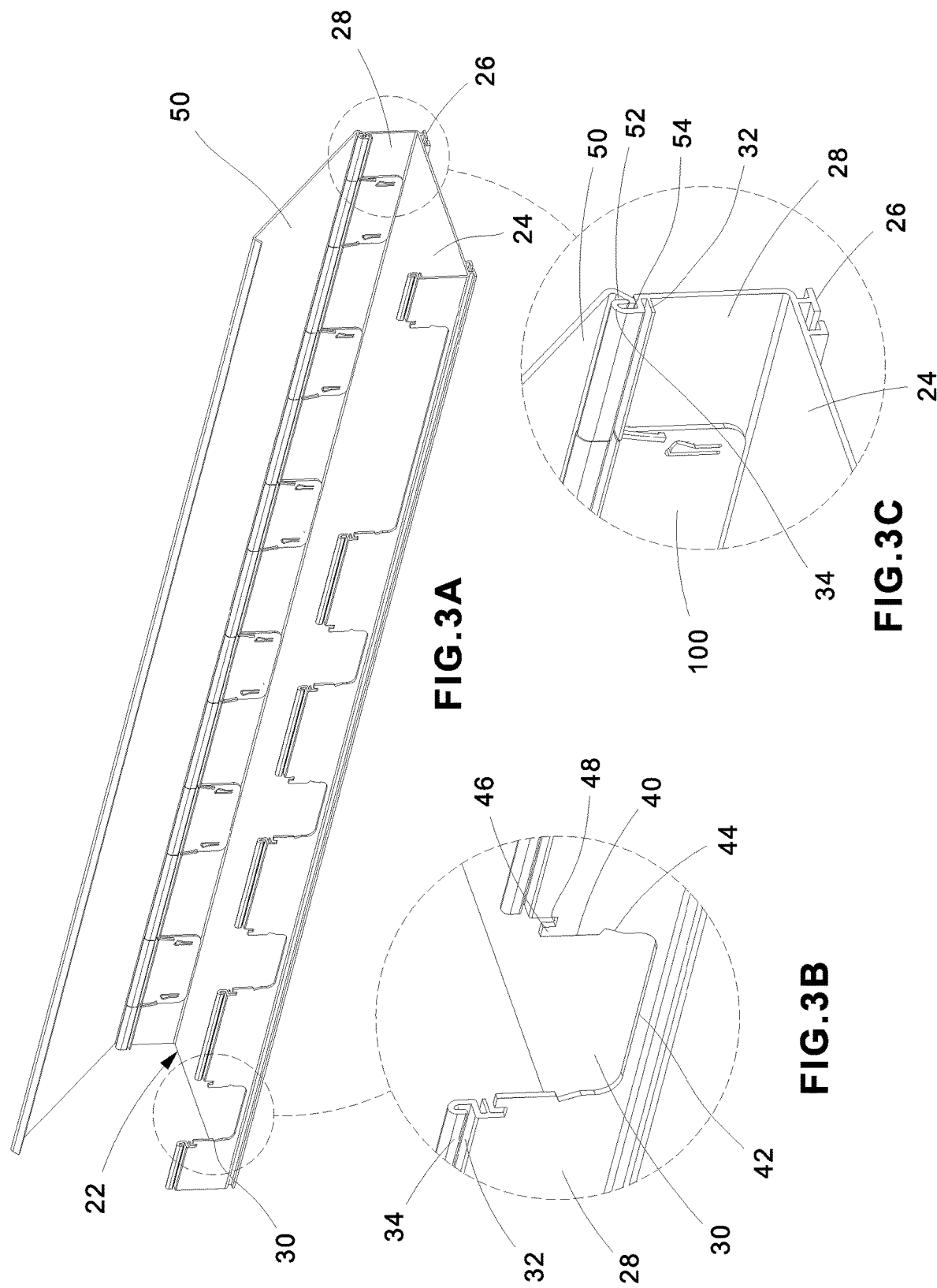

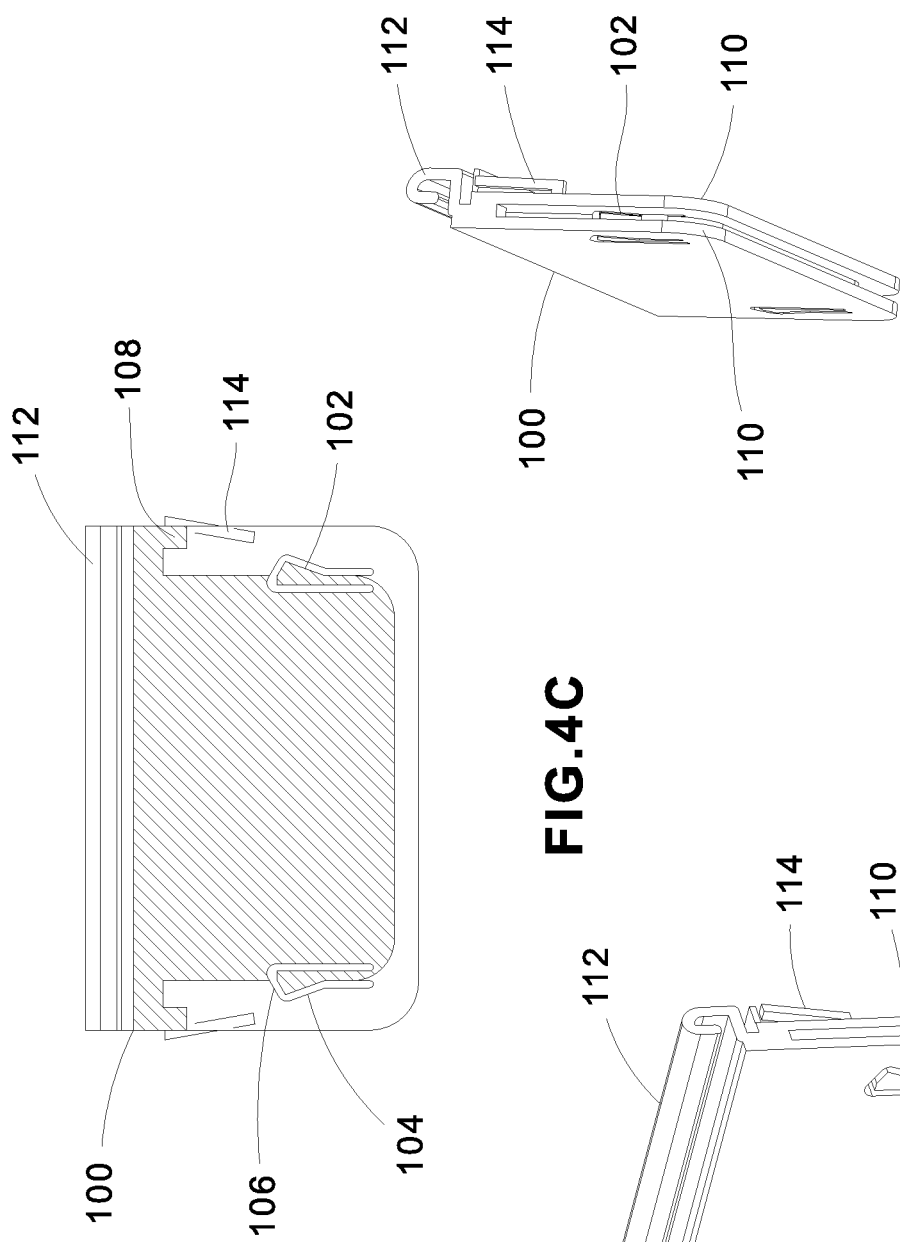
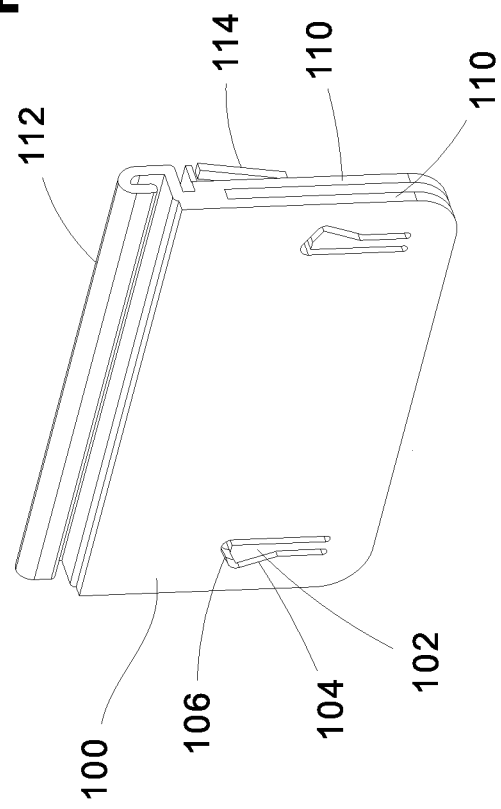
FIG.4B
FIG.4C
FIG.4A

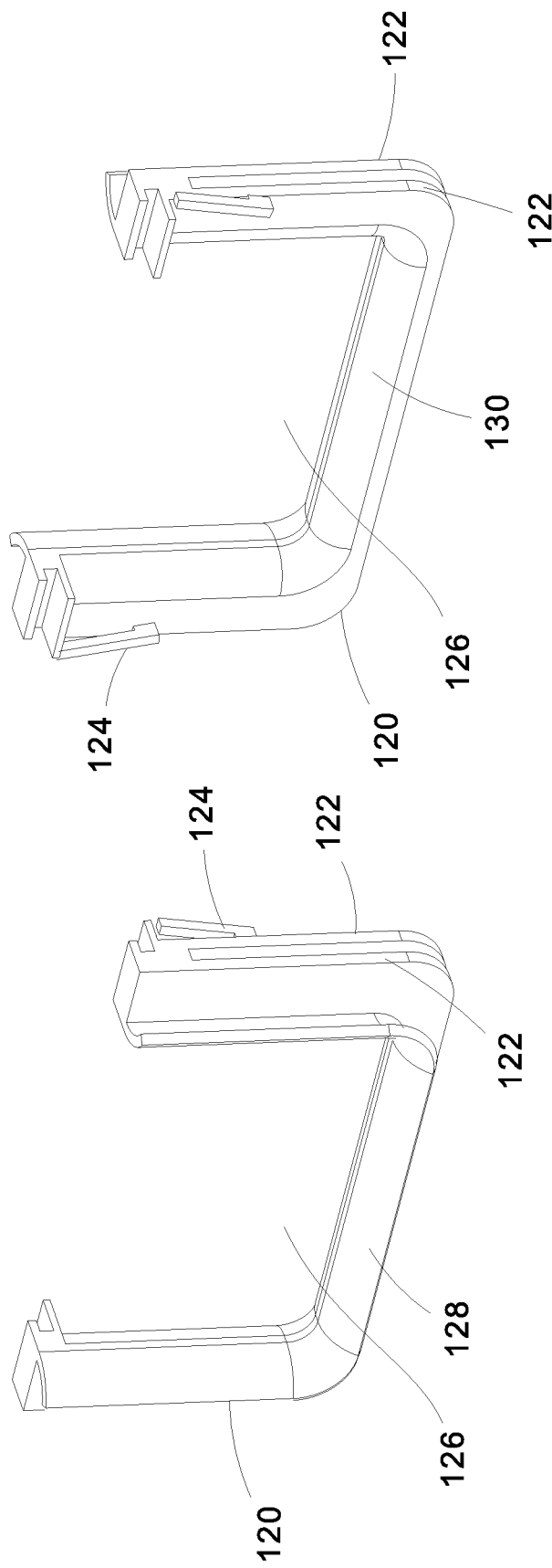

RACEWAY SYSTEM

CROSS REFERENCE TO RELATED APPLICATIONS

This application claims benefit to U.S. Provisional Patent Application No. 62/916,318 filed on Oct. 17, 2019, the entirety of which is hereby incorporated by reference herein.

FIELD OF THE INVENTION

The present invention relates to a raceway system, and more particularly to a raceway system with a plurality of side apertures.

BACKGROUND OF THE INVENTION

It is known in the art to provide a raceway system with various cable routing accessories such as vertical tees, horizontal tees, and cross members that are assembled to the raceway channel sections in a concatenated manner to create an overall raceway layout. This type of raceway assembly requires a significant amount of planning to position the cable routing accessories in the desired physical location as the raceway often needs to accommodate unique configurations.

It would be desirable to provide an improved raceway system with a number of cable routing accessories that are easy to assemble and can be adjusted to accommodate desired configurations after the initial installation.

SUMMARY OF THE INVENTION

A raceway system designed to provide a cable routing pathway that is easily configured during installation and reconfigured if modifications are required. The raceway system includes at least one U-shaped channel defined by a base and sidewalls extending from outer edges of the base. The sidewall includes a plurality of apertures within the sidewall. At least one insert is secured to the side wall at one of the apertures in the sidewall. The insert may be a side insert to cover one of the apertures and strengthen the sidewall. The insert may be a fluted spill out insert installed in one of the apertures to redirect cable routing in the raceway system. The raceway system may also include a vertical tee accessory, a horizontal tee accessory, an extendable raceway channel accessory, or any combination thereof to manage and route cables in the raceway system.

BRIEF DESCRIPTION OF THE DRAWINGS

FIG. 3a is a perspective view of the raceway system of FIG. 2 with the accessories removed from one side of the raceway.

FIG. 3b is a perspective view of the side aperture of FIG. 3a.

FIG. 3c is a perspective view of the end of the raceway of FIG. 3a with the cover partially removed.

FIG. 4a is a perspective view of the raceway insert of FIG. 1.

FIG. 4b is a right side perspective view of the raceway insert of FIG. 4a.

FIG. 4c is a front section view of the raceway insert of FIG. 4a.

FIG. 5a is a front perspective view of the fluted spill out insert of FIG. 1.

FIG. 5b is a rear perspective view of the fluted spill out insert of FIG. 5a.

FIG. 10a is a front perspective view of the horizontal tee accessory of FIG. 1.

FIG. 10b is a rear perspective view of the horizontal tee accessory of FIG. 10a.

FIG. 13a is a perspective view of an extendable raceway channel accessory.

FIG. 13b is a perspective view of the extendable raceway channel accessory of FIG. 13a in a shortened position.

FIG. 13c is an exploded view of the extendable raceway channel accessory of FIG. 13a.

FIG. 14 is a top view of parallel raceways joined by the extendable raceway channel accessory of FIG. 13a.

DETAILED DESCRIPTION

The raceway system 20 of the present invention provides a cable routing path that is easily configured during installation. The raceway system 20 is flexible and requires minimal labor and custom modifications. The raceway system 20 may also be reconfigured, if desired, with minimal labor, while limiting the operational risk associated with modifying existing installed raceways.

Figure 1:
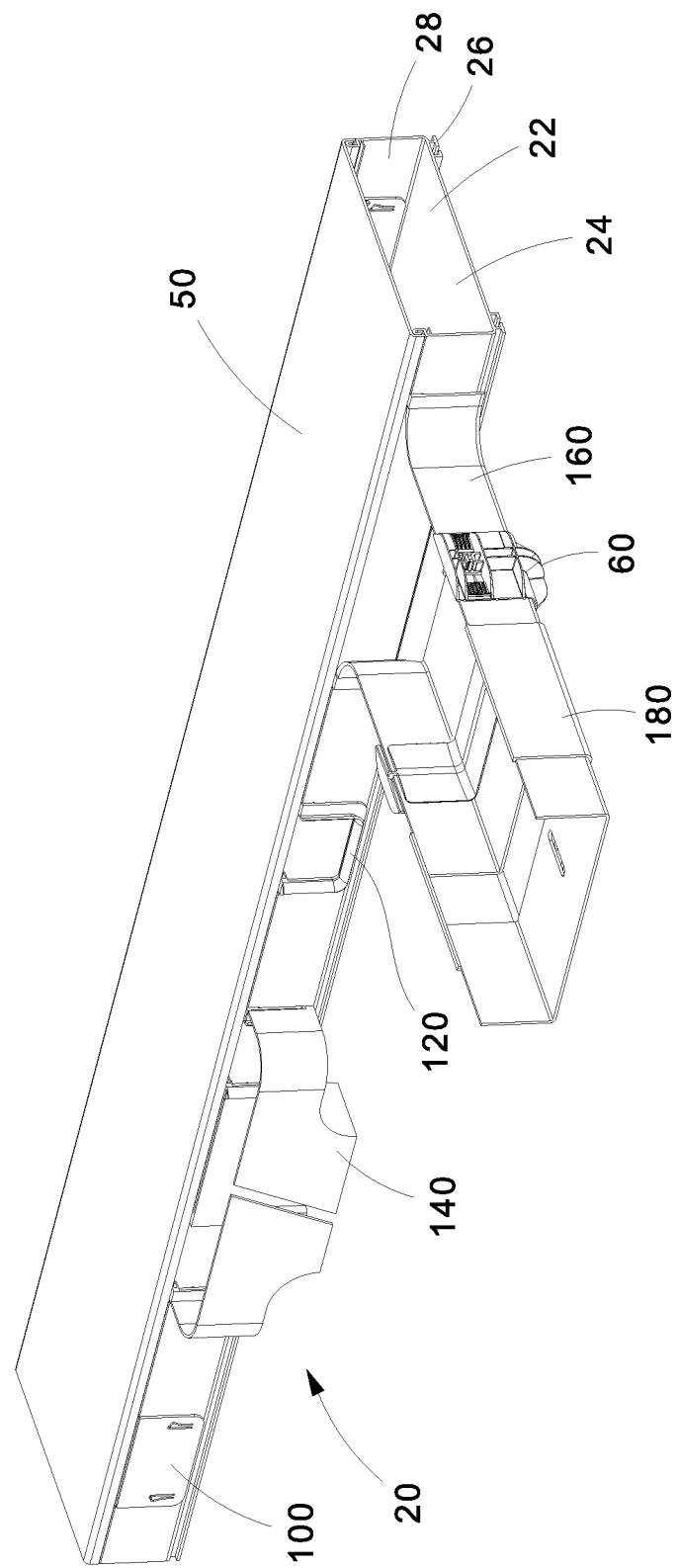
FIG. 1 is a perspective view of the raceway system of the present invention.
Figure 2:
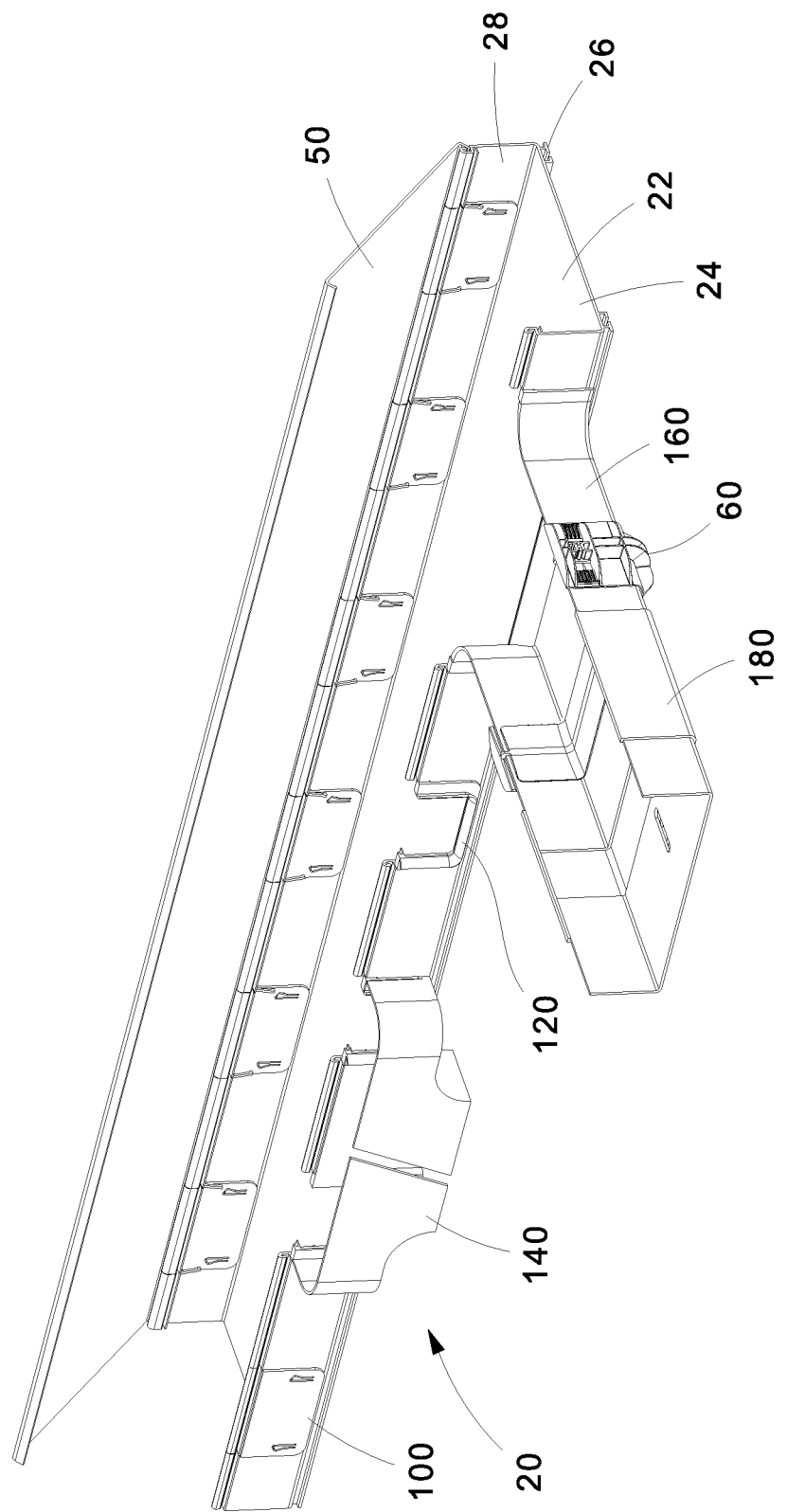
FIG. 2 is a perspective view of the raceway system of FIG. 1 with the cover partially removed.

FIGS. 1 and 2 illustrate the raceway system 20 of the present invention with a number of accessories secured to the sidewalls 28 of the raceway. The raceway includes a U-shaped channel 22 with a base 24, sidewalls 28, and a number of apertures 30 (see FIG. 3A) in the sidewalls 28. Raceway channels 22 may be joined, when desired, using couplers 60 illustrated in FIG. 1.

FIG. 3a illustrates the raceway channel 22 with one sidewall 28 having a plurality of apertures 30 and the other sidewall 28 with a number of inserts 100 installed in the apertures 30. The sidewalls 28 maybe positioned generally perpendicular to the base 24 of the raceway channel 22. The sidewalls 28 run the length of the channel 22.

As illustrated in FIGS. 3a and 3b, the apertures 30 in the sidewalls 28 are pre-cut openings in the channel 22. The shape and features of the apertures 30 are designed to accommodate the raceway inserts and accessories of the present invention. The apertures 30 interact with the inserts and accessories to mechanically lend strength and stability to the raceway channel 22.

Each aperture 30 includes aperture sides 40, an apertures base 42, snap pockets 44, and spanner notches 46. The aperture sides 40 are faces of the aperture 30 that are positioned perpendicular to the raceway base 24 while the aperture base 42 is the face of the aperture 30 that is positioned parallel to the raceway base 24. The snap pockets 44 are notches in the aperture sides 40 that are designed to receive a snap latch 102 (see FIG. 4c) of a side insert 100 or another accessory. The shape of the snap pocket 44 engages the side insert 100 or accessory to securely fit the side insert 100 or accessory in place. The shape of the snap pocket 44 also facilities accessory removal, when desired. The spanner notches 46 are rectangular openings 48 in the raceway sidewall 28 that are designed to mechanically interlock with spanner tabs 108 in the raceway side insert 100 or accessory. This prevents the sidewall aperture 30 from expanding or contracting under bending loads and contributes to the strength of the raceway system's strength.

As illustrated in FIG. 3c, the sidewalls 28 include a flange 32 and a hinge 34 for receiving the raceway cover. The flange 32 extends along the length of the channel in a segmented fashion due to the apertures 28. The base 24 includes fastener mounting channels 26 that run the length of the raceway channel. The fastener mounting channels 26 are located at the bottom of the base 24. The fastener mounting channels 26 receive fasteners and brackets to augment accessory mounting and attachment. The height of the mounting channels may be increased, if desired, to enhance the raceway's stiffness.

The raceway cover 50 is a roughly flat sheet of material that runs the length of the channel. The sides 52 of the cover 50 include a hinge feature 54 designed to interact with the counterpart hinge features 34 in the raceway sidewalls 28 to enable the cover 50 to be easily opened and closed.

FIGS. 4a, 4b, and 4c illustrate a raceway side insert 100 designed to be installed in the apertures 30 in the raceway sidewalls 28, when desired. The raceway side insert 100 is designed to fill the side wall apertures 30 and to recover the strength of the pre-cut raceway by restricting the expansion and contraction of the aperture geometry. Using multiple side inserts 100 in a series of side wall apertures 30 effectively creates the functionality of a solid continuous raceway side wall typically found in prior art raceway designs. The side insert 100 can be produced in different widths to span different aperture sizes. The side insert 100 is an optional accessory. If the raceway can be handled and installed in a manner that maintains the geometric integrity of the raceway, the inserts 100 may not be required.

The raceway side insert 100 includes snap latches 102, spanner tabs 108, and straddle flanges 110. The snap latch 102 interacts with the snap pockets 44 in the apertures 30 to retain the insert 100 within the aperture 30 in the fully installed position. The snap latch 102 includes ramped lead ins 104 and lead outs 106 so the insert 100 can be securely installed. The structure of the snap in latches 102 also enables the side insert 100 to be removed and reused, when desired. The spanner tabs 108 protrude within the insert 100. The spanner tabs 108 interlock with the aperture notches 46 when the side insert is fully installed. Through this locking action, the aperture shape is constrained under the loading that would expand the aperture opening as well as compress it.

The straddle flanges 110 of the insert 100 straddle the raceway sidewalls 28 when the insert 100 is installed in the aperture 30. The flanges 110 ensure that the side insert 100 is aligned and maintains the correct position relative to the raceway side walls.

The interior faces of the insert 100 are shaped such that the perimeter closely matches the shape of the aperture 30. The interaction between the geometry of the interior faces and the aperture supports the raceway under loading that would compress the geometry of the aperture.

The top of the insert 100 may or may not include a hinge 112 that extends the length of the insert 100. The hinge 112 is similar to the hinge 112 at the top of the raceway sidewalls 28. As illustrated in FIGS. 1 and 2, the hinges 112 receive the cover 50 of the raceway system.

The insert 100 also includes cantilevered snaps 114. The cantilever snaps 114 are attached to the straddle flanges 110 in a manner that allows them to flex parallel to the face of the flange. The end of the snap extends beyond the outer edges of the insert 100. When the insert 100 is installed, the snaps 114 flex inward toward the center of the insert 100 due to the interaction with the edge of the segmented side wall flange. When the insert 100 is fully seated, the cantilever snap 114 will clear the side wall flange 32 and snap underneath it creating a mechanical interference. As a result, the insert 100 is retained. To remove the insert 100, the snaps 114 are manually squeezed toward the center of the insert 100 to clear the side wall flange 32.

Figure 6:
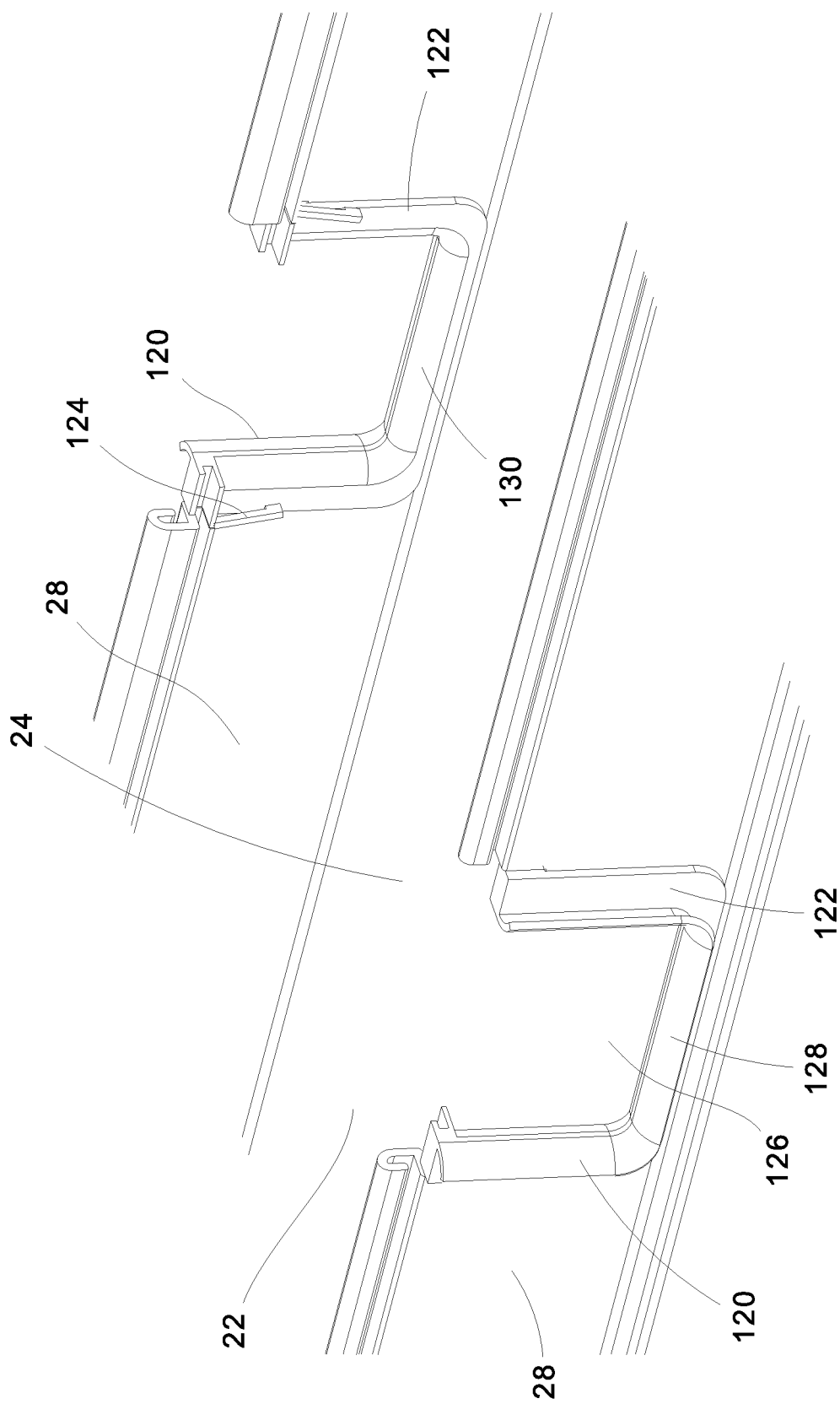
FIG. 6 is a partial perspective view of the raceway system of the present invention with the fluted spill out inserts of FIG. 5a installed in the raceway.

FIGS. 5a and 5b illustrate a fluted spill out insert 120. FIG. 6 illustrates the fluted spill out inserts 120 installed in a section of the raceway channel 22. The fluted spill out insert 120 replaces the raceway side insert 100 in any location along the raceway channel 22 where the user would like to route cable out of the raceway to redirect its path. If a raceway system is already installed, the raceway side insert 100 would be removed and the fluted spill out insert would be installed in its place.

The fluted spill out insert 120 includes straddle flanges 122 and cantilevered snaps 124 similar to the straddle flanges 110 and cantilevered snaps 114 of the side insert 100. The straddle flanges 122 and the cantilevered snaps 124 work in the same fashion as described above with respect to the raceway side insert 100.

The fluted spill out insert 120 also includes a cable pass through 126, an exterior flute bend radius control flange 128, and an interior bend radius control 130. The cable pass through 126 is a U-shaped open space that allows cable to enter and exit the raceway channel 22. The exterior flute bend radius control flange 128 is a radiused flange that extends around the cable pass through 126 to prevent tight bends in the cables. The interior bend radius control 130 is a radiused edge that extends around the cable pass through 126 preventing tight bends in the cables.

Figure 7:
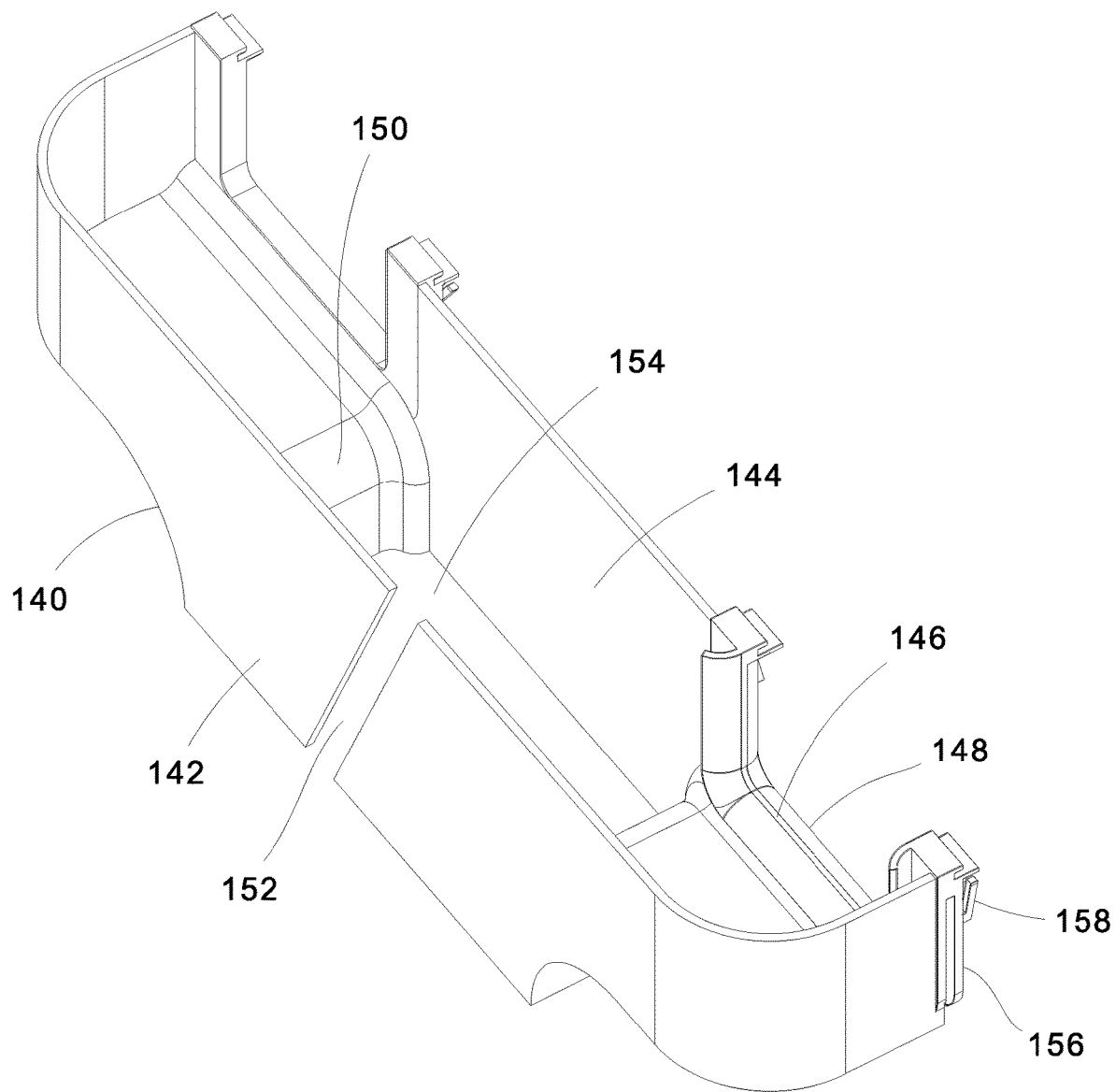
FIG. 7 is a front perspective view of the vertical tee accessory of FIG. 1.
Figure 8:
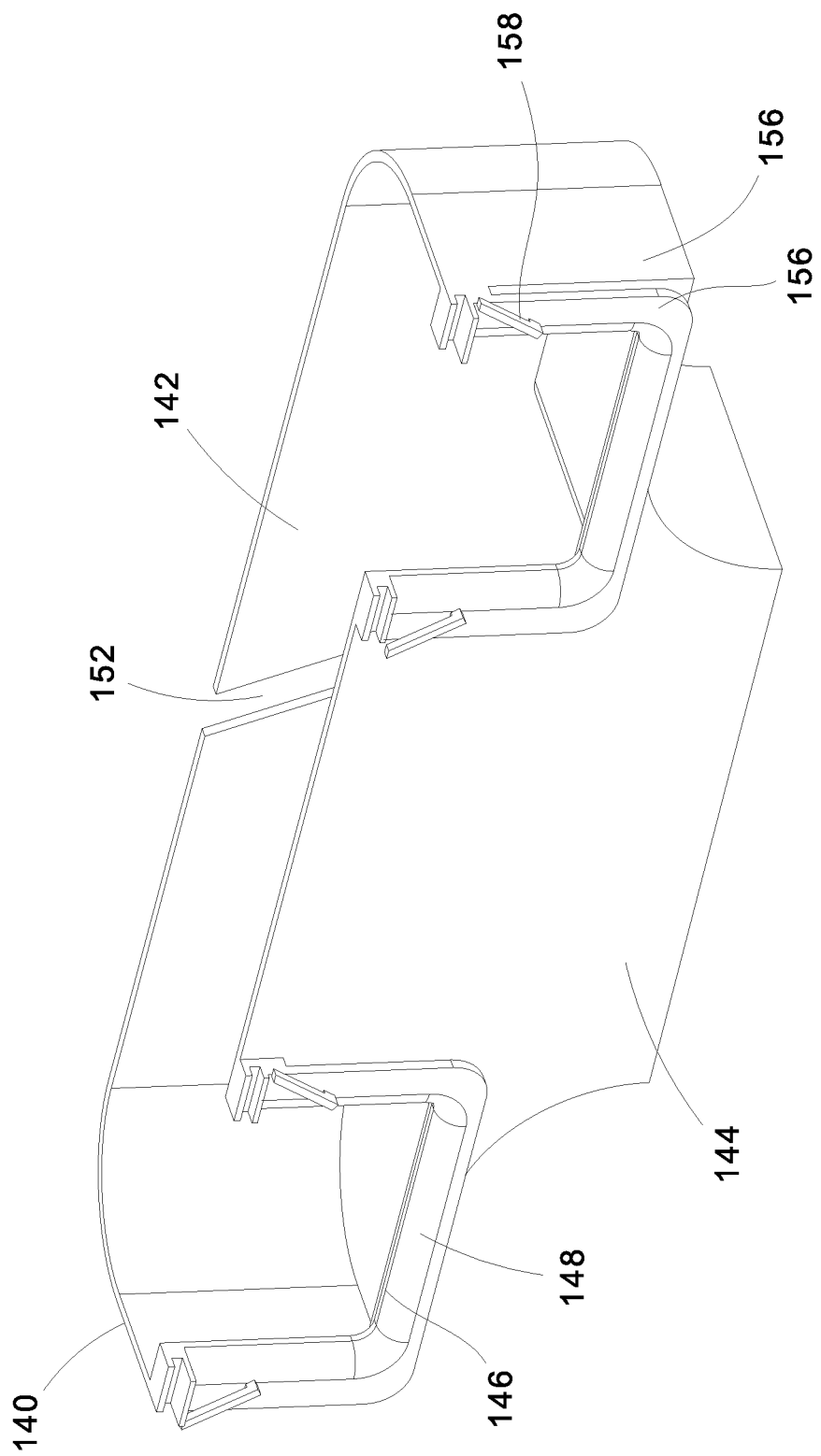
FIG. 8 is a rear perspective view of the vertical tee accessory of FIG. 7.
Figure 9:
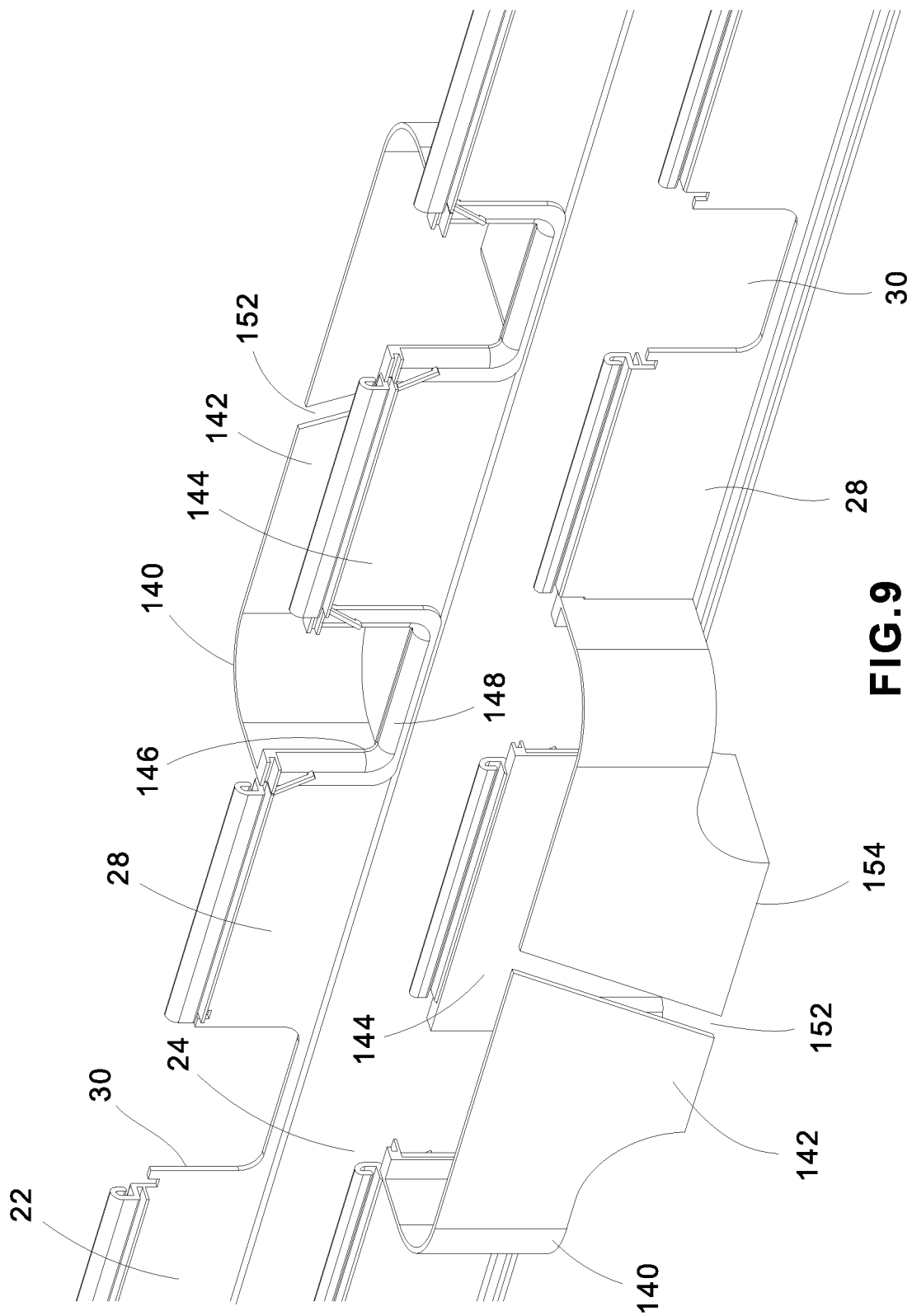
FIG. 9 is a partial perspective view of the raceway system of the present invention with the vertical tee accessory of FIG. 7 installed in the raceway.

FIGS. 7 and 8 illustrate the vertical tee accessory 140 designed to be installed in the raceway system 20 of the present invention. FIG. 9 illustrates the vertical tee accessory 140 installed in the raceway channel 22. The vertical tee accessory 140 enables horizontal cables routed in the raceway channel 22 to transition in a managed fashion to a vertical orientation or vice versa. The vertical tee accessory 140 spans over two apertures 30 in the raceway sidewalls 28 to mount the vertical tee 140 alongside the raceway channel 22. This allows cable to enter and exit the channel 22 in two directions, if desired.

The vertical tee accessory 140 includes a front member 142, a rear member 144, interior bend radius control 146, vertical cable path bend radius control 150, an angled vertical tee access slot 152 and a bottom opening 154. The interior bend radius control 146 has a radiused edge 148 that extends around the cable pass through to prevent tight bends in the cables. The vertical cable path bend radius control 146 also has a radiused flange 148 that prevents tight bends in the cables that enter and exit through the bottom opening 154 of the vertical tee accessory 140.

The angled vertical tee access slot 152 is located in the center of the front member 142. The angled access slot 152 allows cables to pass into or out of the vertical tee 140 without having to fish the cables through the vertical tee bottom opening 154. The angle access slot 152 allows the cables to be placed in the vertical tee 140, however, the cables cannot come out because the cables do not natural lay or get dress in alignment with the angle of the access slot 152. The bottom opening 154 is located at the bottom of the front and rear members 142, 144, respectively, of the vertical tee 140. The bottom opening 154 allows cables to enter and exit the vertical tee in a vertical orientation.

The vertical tee accessory 140 also includes straddle flanges 156 and cantilevered snaps 158 similar to the straddle flanges 110 and cantilevered snaps 114 of the side insert 100. The straddle flanges 156 and the cantilevered snaps 158 work in the same fashion as described above with respect to the raceway side insert 100.

Figure 10:
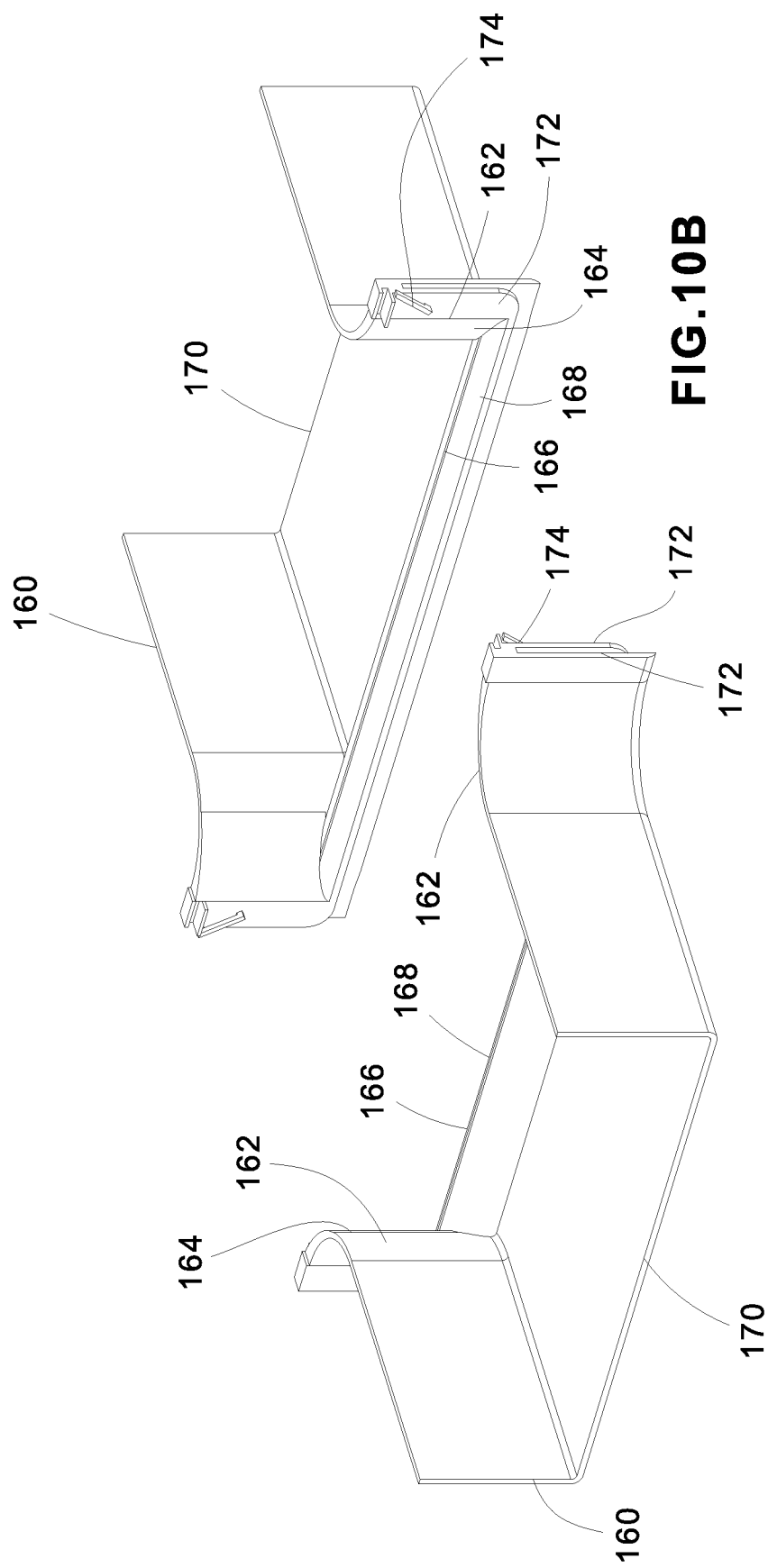
Figure 11:
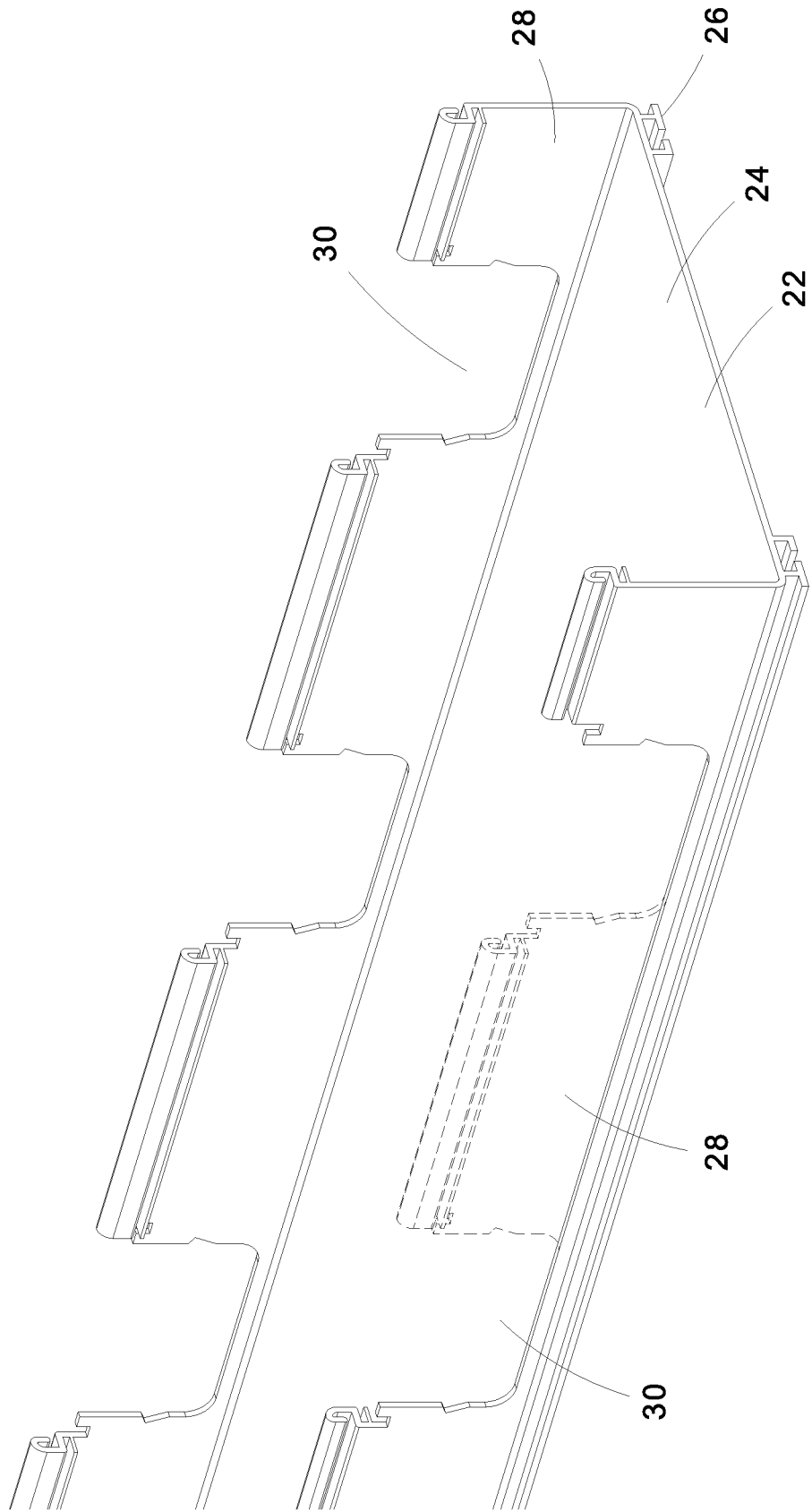
FIG. 11 is a perspective view of the raceway system with cut lines.
Figure 12:
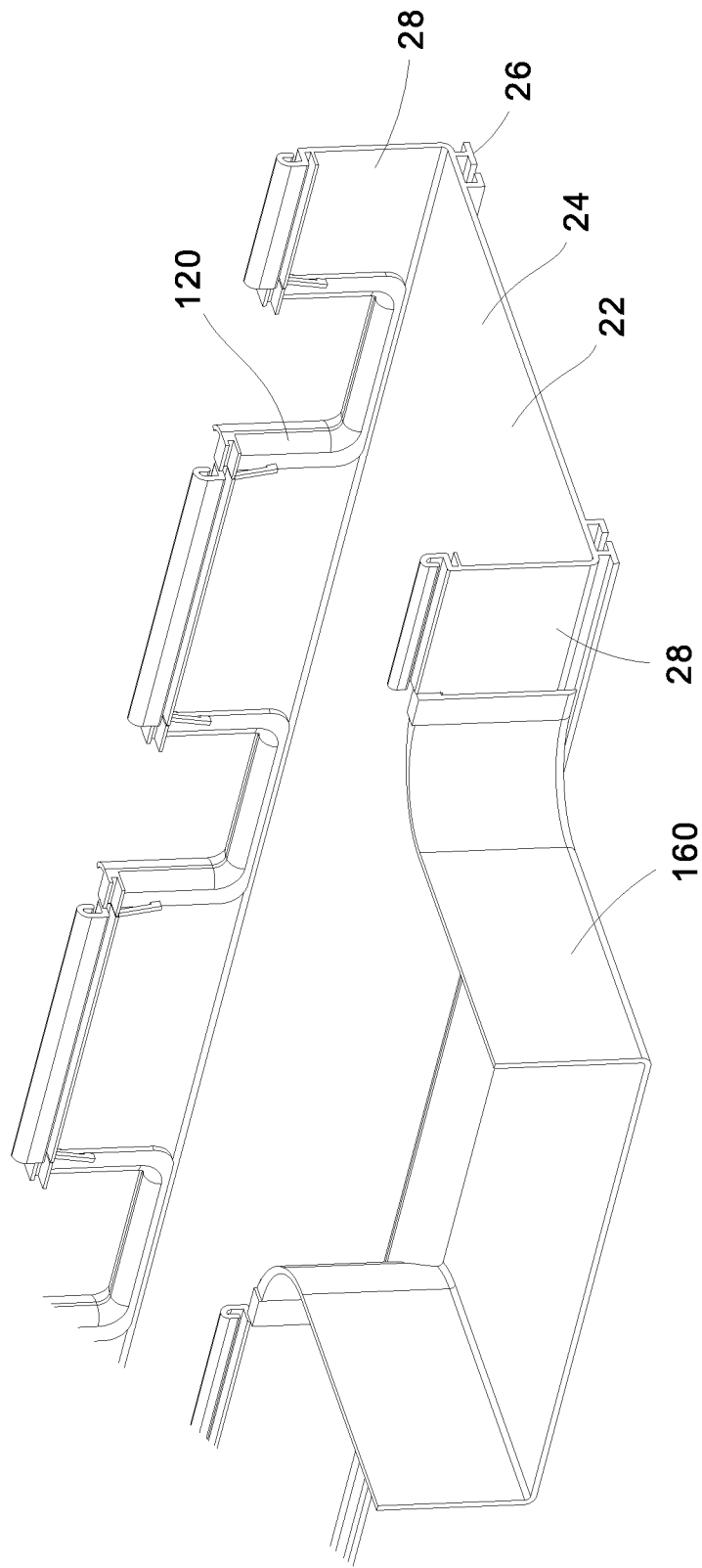
FIG. 12 is a perspective view of the raceway system of FIG. 11 with the horizontal tee accessory and fluted spill out inserts installed in the raceway.

FIGS. 10*a* and 10*b* illustrate the horizontal tee accessory 160 to be installed in the raceway system 20 of the present invention. FIG. 11 illustrates the raceway channel 22 and cut lines for side wall 28 removal of the raceway channel 22 prior to installing the horizontal tee accessory 160. FIG. 12 illustrates the horizontal tee accessory 160 installed in the raceway channel 22. The horizontal tee accessory 160 allows cables to horizontally transition in a managed fashion from one raceway channel 22 to another intersecting raceway channel 22. The intersecting raceway channels are generally oriented orthogonally, but other angles are possible. The horizontal tee 160 can be installed in a single aperture or depending on the width of the horizontal tee, a wider aperture can be created by cutting the sidewall (see FIG. 11) of the channel between adjacent apertures. Placing two horizontal tees 160 across from each other on opposite sides of the channel creates a channel cross or a four-way intersection. The horizontal tee 160 could be installed over two apertures in the sidewall similar to the vertical tee 140. Likewise, the vertical tee 140 could be installed over two apertures in the sidewall with the sidewall in-between being cut similar to the horizontal tee 160.

The horizontal tee accessory 160 includes horizontal bend radius controls 162, an interior bend radius control 166, and a horizontal tee free end 170. The horizontal bend radius controls 162 are radiused edges 164 that prevent tight cable bends and manage the cable transitioning from one raceway channel to another in a horizontal plane. The interior bend radius control 166 is a radiused edge 168 that extends along the bottom edge of the horizontal tee 160 to prevent tight bends as the cable transitions from one raceway channel to another. The horizontal tee 160 free end takes the same general shape as a raceway channel 22 and therefore can be joined to another raceway channel by couplers 60 as described above.

The horizontal tee accessory also includes straddle flanges 172 and cantilevered snaps 174 similar to the straddle flanges 110 and cantilevered snaps 114 of the side insert 100. The straddle flanges 172 and the cantilevered snaps 174 work in the same fashion as described above with respect to the raceway side insert 100.

Figure 13:
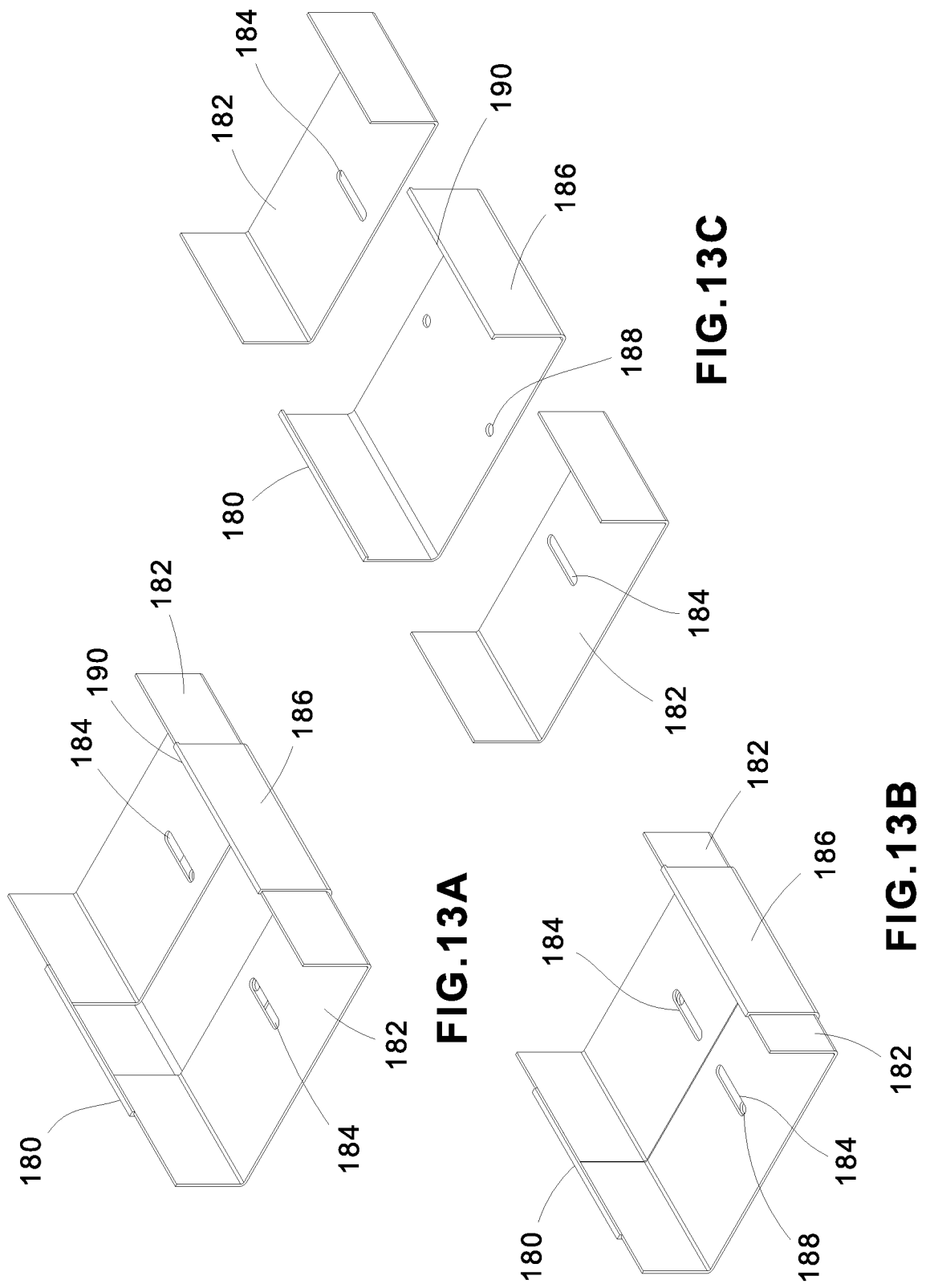
Figure 14:
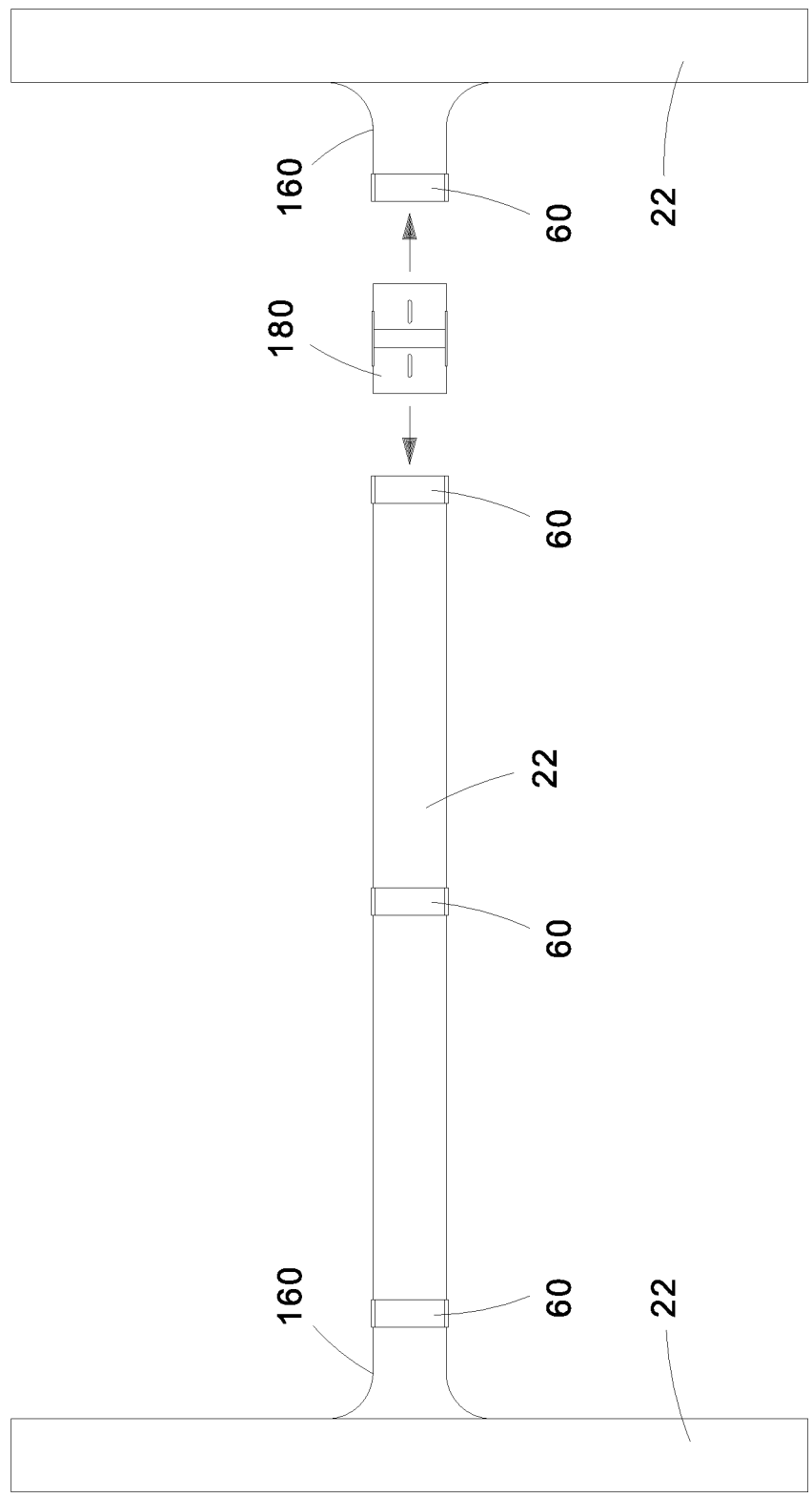

FIGS. 13*a*, 13*b*, and 13*c* illustrate an extendable raceway channel 180 that may be used with the raceway system of the present invention. The extendable raceway channel 180 is a section of raceway designed such that its length can be adjusted. The extendable raceway channel 180 is useful when bringing two parallel raceway paths that are fixed in location to the building or other solid structure (see FIG. 14). The distance between the parallel raceways is typically fixed, as a result, the use of couplers 60 to make the final connection to join the parallel raceways is not possible. To lock the raceway into a coupler 60, it must be inserted and then translated within the coupler 60. The translation creates the problem because the length of the raceway that can fit between the opposing coupler ends is too short to span the necessary distance once it is inserted into one of the couplers 60. The extendable raceway solves this problem because it can be extended into each opposing coupler 60 to complete the raceway section.

The extendable raceway channel 180 includes channel slides 182, channel slide bolt slots 184, channel slide base 186, bolt holes 188, and channel base lip 190. The channel slide base 186 is a U-shaped channel that nests two channel slides 182 within it in a movable fashion. The channel slides 182 are positioned on each side of the channel slide base 186. The channel slides 182 are U-shaped channel sections that can slid relative to the channel slide base 186 to allow the length of the raceway channel to be extended into opposing couplers. The slides 182 include a slot 184 that a threaded bolt can pass through, but the bolt head cannot. The slot 184 allows the slide 182 to move relative to the bolt which is fixed in the base 186. The channel slide base 186 includes bolt holes 188 and a channel base lip 190 to prevent the channel slides 182 from being removed from the channel slide base 186 in a vertical direction. The bolt holes 188 allow the bolt threads to pass through. A nut is threaded on the bolt threads on the underside of the channel slide base 186 and then tightening to fix the slides in position after the slides 182 have been inserted into the opposing couplers. The bolt and nut can be preinstalled.

The raceway system 20 of the present invention enables many different raceway layout configurations to be easily constructed with less upfront planning. The cable routing accessories can be easily added to the raceway, where needed, in a very flexible manner. As a result, the need for upfront layout planning and raceway cutting has been reduced. The raceway system also provides the advantages of reduced planning errors, fastener install time with less labor effort, and less debris generated. The fluted spill out assembly is low profile and does not consume vertical space above the raceway and the vertical tee accessory attaches to the side of the raceway so it does not consume raceway fill capacity enabling the full fill capacity of the raceway to be utilized.

Day 2 installation and modifications of the raceway system are also easier. The raceway system of the present invention is adaptable, flexible and reduces operation risk when a raceway re-configuration is needed after the installation with cables.

Prior art systems use accessories such as a vertical tee or horizontal tee that are installed in a concatenated manner. Adding these accessories to an existing installation is risky and difficult. The cable duct would need to be cross-sectioned or a portion of the solid side wall cut-out and removed to add the accessory all while ensuring the cables are not damaged. Even then, because the raceway is fixed, or land locked, the use of standard couplers is not possible. More expensive, specialized bracketry would be required. The raceway system of the present invention does not use concatenated accessories which greatly reduces the complexity of day 2 re-configurations.

Additionally, the raceway system of the present invention may be manufactured by many methods and materials. The preferred manufacturing method of the raceway channel is plastic extrusion with post processing to create channel apertures in the desired shapes, spacing, and frequency, as well as cut the channel to length. Post processing may include die punching, milling, drilling, cutting or laser machining. The post processing steps could allow the cable duct to be customized to a customer's unique specifications. In this way a pre-configured raceway system can be created. The preferred manufacturing method of the raceway cover is also plastic extrusion with post processing, if necessary.

The raceway side insert, fluted spill out inserts, vertical tee, and horizontal tee are produced with plastic injection molding. However, metal brackets could be used to support accessories. Ideally, the accessories are molded as a single piece. However, if a single piece is not possible, the accessories are molded as multiple pieces and assembled together. Post processing may also be needed on the raceway accessories. The extendable raceway channel may be produced by injection molding or extrusion with post processing, cutting, drilling, or milling.

The aperture configuration of the raceway system can be customized during post extrusion processing to meet the unique facility layout requirement of individual customers. The unique raceway, in combination with the accessories, would allow the customer to simply snap the raceway together at their site very quickly raceway, with less labor, and little to no need of cutting.

Furthermore, while the particular preferred embodiments of the present invention have been shown and described, it will be obvious to those skilled in the art that changes, and modifications may be made without departing from the teaching of the invention. The matter set forth in the foregoing description and accompanying drawings is offered by way of illustration only and not as limitation. The actual scope of the invention is intended to be defined in the following claims when viewed in their proper perspective based on the prior art.

The invention claimed is:

1. A raceway system for providing a cable routing pathway, the raceway system comprising:
   at least one U-shaped channel defined by a base and sidewalls extending from outer edges of the base, the sidewalls are perpendicular to the base;
   a plurality of apertures in the sidewalls;
   at least one insert secured to the sidewall at one of the apertures in the sidewalls;
   wherein each aperture includes aperture sides that are positioned perpendicular to the base, an aperture base that is parallel to the base, and snap pockets in the aperture sides for receiving the at least one insert; and
   wherein each aperture further includes spanner notches, the spanner notches are rectangular notches for interlocking with the at least one insert.

2. The raceway system of claim 1, wherein each sidewall has a flange and a hinge along the top of the sidewalls, the flange and hinge extend along the length of the channel segmented at the apertures; and a raceway cover that runs a length of the channels, the raceway cover having sides with a hinge that engages the hinge of the sidewalls.

3. The raceway system of claim 1, further comprising a vertical tee accessory secured to one of the sidewalls for enabling horizontal cables routed in the raceway system to transition to a vertical orientation, wherein the vertical tee accessory spans over at least two apertures in the sidewall; and
   wherein the vertical tee accessory includes a front member, a rear member, an interior bend radius control, vertical cable path bend radius control, and a bottom opening.

4. The raceway system of claim 3, wherein the interior bend radius control has a radiused edge that extends around a cable pass through for preventing tight bends in the cables and the vertical cable path bend radius control has a radius flange that prevents tight bends in the cables that enter and exit the bottom opening.

5. The raceway system of claim 3, wherein the vertical tee accessory includes an angled access slot located in the front member for allowing cables to pass into and out of the vertical tee.

6. The raceway system of claim 3, wherein the vertical tee accessory includes straddle flanges that are positioned on either side of the sidewall to ensure the vertical tee accessory is aligned and maintained over the apertures in the sidewall.

7. The raceway system of claim 6, wherein the vertical tee accessory includes cantilevered snaps attached to the straddle flanges, the cantilevered snaps flex to be parallel to the straddle flanges, wherein the cantilever snaps engage a flange extending from the sidewall to create an interference fit retaining the vertical tee accessory on the sidewall.

8. The raceway system of claim 1, further comprising a horizontal tee accessory secured to one of the side walls for transitioning cables horizontally from one channel to an intersecting channel;
   wherein the horizontal tee accessory includes a horizontal tee free end, horizontal bend radius controls with radiused edges for preventing tight cable bends and managing cable transitioning from one channel to another channel, and an interior bend radius control with a radiused edge extending along the bottom edge of the horizontal tee accessory for preventing tight bends as the cable transitions for one channel to the intersecting channel.

9. The raceway system of claim 8, wherein the horizontal tee accessory includes straddle flanges that are positioned on either side of the sidewall to ensure the horizontal tee accessory is aligned and maintained over the apertures in the sidewall.

10. The raceway system of claim 9, wherein the horizontal tee accessory includes cantilevered snaps attached to the straddle flanges, the cantilevered snaps flex to be parallel to the straddle flanges, wherein the cantilever snaps engage a flange extending from the sidewall to create an interference fit retaining the horizontal tee accessory on the sidewall.

11. The raceway system of claim 1, further comprising an extendable raceway channel accessory for joining two parallel channels that are fixed in location;
   wherein the extendable raceway channel accessory includes a channel slide base with holes for receiving fasteners, and channel slides with elongated slots positioned on each side of the channel slide base;
   the channel slides slid relative to the channel slide base to allow the length of the extendable raceway channel accessary to be adjusted;
   fasteners secure the channel slides in position with respect to the channel slide base; and
   the channel slide base includes a channel base lip on each side of the channel slide base to prevent the channel slides from being removed in a vertical direction.

12. A raceway system for providing a cable routing pathway, the raceway system comprising:
   at least one U-shaped channel defined by a base and sidewalls extending from outer edges of the base, the sidewalls are perpendicular to the base;
   a plurality of apertures in the sidewalls;
   at least one insert secured to the sidewall at one of the apertures in the sidewalls, wherein the at least one insert includes a side insert for covering one of the apertures and strengthening the sidewall, wherein the side insert has straddle flanges that are positioned on either side of the sidewall to ensure the side insert is aligned and maintained over one of the apertures in the sidewall; and wherein the side insert has snap latches that intersect with snap pockets in one of the apertures to retain the side insert within one of the apertures, the snap latches include a ramped lead in and a lead out.

13. The raceway system of claim 12, wherein the side insert has spanner tabs that interlock with spanner notches in one of the apertures when the side insert is installed in one of the apertures.

14. The raceway system of claim 12, wherein the side insert includes cantilevered snaps attached to the straddle flanges, the cantilevered snaps flex to be parallel to the straddle flanges, wherein the cantilever snaps engage a flange extending from the sidewall to create an interference fit retaining the side insert on the sidewall.

15. A raceway system for providing a cable routing pathway, the raceway system comprising:

at least one U-shaped channel defined by a base and sidewalls extending from outer edges of the base, the sidewalls are perpendicular to the base;

a plurality of apertures in the sidewalls;

at least one insert secured to the sidewall at one of the apertures in the sidewalls; and wherein the at least one insert includes a fluted spill out insert installed in one of the apertures in the sidewall for redirecting cable routing in the raceway system, the fluted spill out insert includes a cable pass through, an exterior bend radius control that extends around the cable pass through, and an interior bend radius control that extends around the cable pass through.

16. The raceway system of claim 15, wherein the fluted spill out insert has straddle flanges that are positioned on either side of the sidewall to ensure the fluted spill out insert is aligned and maintained over the aperture in the sidewall.

17. The raceway system of claim 16, wherein the fluted spill out insert includes cantilevered snaps attached to the straddle flanges, the cantilevered snaps flex to be parallel to the straddle flanges, wherein the cantilever snaps engage a flange extending from the sidewall to create an interference fit retaining the fluted spill out insert on the sidewall.

\* \* \* \* \*